(No Model.)

O. PIPER.
LOOM TEMPLE.

No. 414,657.  Patented Nov. 5, 1889.

Witnesses.
Edgar A. Gethin
Frederick L. Emery

Inventor.
Orin Piper,
by Emery & Gregory
Attys

UNITED STATES PATENT OFFICE.

ORIN PIPER, OF MANCHESTER, NEW HAMPSHIRE, ASSIGNOR TO THE DUTCHER TEMPLE COMPANY, OF HOPEDALE, MASSACHUSETTS.

LOOM-TEMPLE.

SPECIFICATION forming part of Letters Patent No. 414,657, dated November 5, 1889.

Application filed August 16, 1889. Serial No. 321,003. (No model.)

*To all whom it may concern:*

Be it known that I, ORIN PIPER, of Manchester, county of Hillsborough, State of New Hampshire, have invented an Improvement in Loom-Temples, of which the following description, in connection with the accompanying drawings, is a specification, like letters on the drawings representing like parts.

My invention relates to certain improvements in that class of loom-temples in which it has been attempted to reduce the friction of the toothed roller by providing the same with bearings of glass, porcelain, or other vitreous material, the object of my invention being to so construct a loom-temple of this character as to prevent rapid wear of the bearing-surfaces, to simplify and cheapen the construction of the device, and to retain the roller in its proper longitudinal position in the temple. These objects I attain in the manner hereinafter set forth, reference being had to the accompanying drawings, in which—

Figure 3:
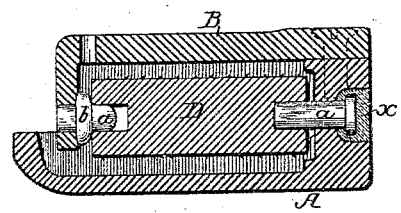
Figure 2:
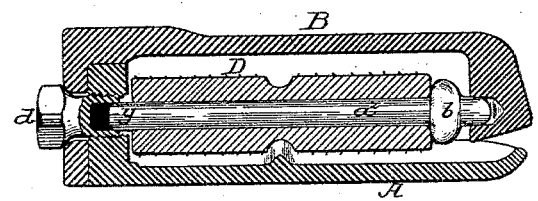
Figure 1:
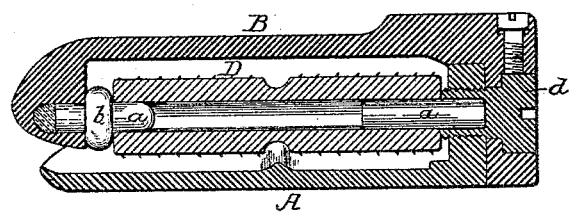

Figure 1 is a longitudinal section of an ordinary form of loom-temple provided with roller-bearings in accordance with my invention. Fig. 2 is a longitudinal section of a like form of temple, showing a different form of bearing for the roller; and Fig. 3 is a sectional view of another form of temple, but illustrating still another form of my improved roller-bearing.

A represents the lower portion or trough of the temple, and B the upper portion or cap of the same, which may, as regards their general construction, be similar to and secured together in the same manner as those of any ordinary temple. The bearing for the toothed roller D of my improved temple, however, consists of glass or other vitreous material, secured to or carried by the temple-case and adapted to the central opening or openings formed in the toothed roller, so as to provide an anti-friction bearing therefor, and thus dispense with the necessity of lubricating the bearing and prevent the soiling of the fabric, which is frequently due to such lubrication.

In the temple shown in Fig. 1 the roller-bearing is in the form of inner and outer pivot-pins of glass, porcelain, or other vitreous material, the inner pin $a$ being secured to the depending inner end of the cap B of the temple-case, and the outer pin $a'$ being carried by a hollow set-screw $d$, whereby the two parts of the temple-case are secured together, the inner pin $a$ having an annular rib or collar $b$, which serves as an end bearing for the roller D, so as to insure the proper longitudinal position of the roller in the temple-case.

In Fig. 2 I have shown a single pin or spindle $a^2$ in place of the two pivot-pins $a$ $a'$, the inner end of said spindle $a^2$ having the bearing-collar $b$ and being adapted to an opening in the depending inner end of the cap of the temple-case, while the other end of the spindle enters the hollow set-screw $d$ and is seated against an elastic cushion $y$ therein, whereby the pin or spindle is held securely in place without risk of breakage.

In the temple shown in Fig. 3 the inner pivot-pin $a$ is carried by the depending end of the cap B of the temple-case, and the outer pin $a'$ has an enlarged head embedded in an opening in the outer end of the trough A and secured therein by suitable cement $x$.

By securing a pivot-pin to the temple-case and adapting it to an opening in the toothed roller the wear is distributed throughout the entire surface of said opening, thus overcoming a serious objection to that class of temples in which the toothed roller is provided with short tubes of porcelain or other vitreous material for receiving wooden pins carried by the temple-case, as in such temples the wear is wholly upon the under side of the wooden pins, owing to the upward pressure of the bearings of the roller against the same. Consequently the bearings become worn out much sooner than those constructed in accordance with my invention.

A metal pin may take the place of the glass pin at the outer end of the temple, if desired; but the use of pins of glass or other vitreous material at both ends of the temple-roller is preferred.

I claim—

1. The combination of the temple-case and the toothed roller with a pivot-pin of glass or other vitreous material carried by said case and adapted to an opening in the roller, so as to serve as a bearing therefor, substantially as specified.

2. The combination of the temple-case and the toothed roller with a pivot-pin of glass or other vitreous material carried by the case and adapted to an opening in the roller, said pin having a rib or collar serving as a bearing for the end of the roller, substantially as specified.

3. The combination of the temple-case and the toothed roller with opposite pins of glass or other vitreous material carried by the temple-case and adapted to openings in the opposite ends of the roller, substantially as specified.

4. The combination of the temple-case and its toothed roller with a bearing of glass or other vitreous material therefor, the bearing at the inner end of the roller being adapted to the case and having a rib or collar serving as an end bearing for the roller, and the bearing at the outer end being carried by a hollow set-screw, substantially as specified.

In testimony whereof I have signed my name to this specification in the presence of two subscribing witnesses.

ORIN PIPER.

Witnesses:
GEO. W. GREGORY,
FREDERICK L. EMERY.